United States Patent
Vered et al.

(10) Patent No.: US 12,423,798 B2
(45) Date of Patent: Sep. 23, 2025

(54) SHAPE LOCALIZATION FOR EXAMINING A SEMICONDUCTOR SPECIMEN

(71) Applicant: Applied Materials Israel Ltd., Rehovot (IL)

(72) Inventors: Gilad Vered, Giv'at Shmuel (IL); Dror Alumot, Tel Aviv (IL); Uri Hadar, Tel Aviv (IL); Elran Gamzo, Rosh Haayin (IL)

(73) Assignee: Applied Materials Israel Ltd., Rehovot (IL)

( * ) Notice: Subject to any disclaimer, the term of this patent is extended or adjusted under 35 U.S.C. 154(b) by 523 days.

(21) Appl. No.: 17/880,535

(22) Filed: Aug. 3, 2022

(65) Prior Publication Data
US 2024/0046445 A1 Feb. 8, 2024

(51) Int. Cl.
*G06T 7/50* (2017.01)
*G06T 7/00* (2017.01)

(52) U.S. Cl.
CPC .............. *G06T 7/001* (2013.01); *G06T 7/50* (2017.01); *G06T 2207/30148* (2013.01)

(58) Field of Classification Search
CPC .................... G06T 7/001; G06T 7/50
See application file for complete search history.

(56) References Cited

U.S. PATENT DOCUMENTS

| | | | |
|---|---|---|---|
| 2005/0146714 A1* | 7/2005 | Kitamura | G06T 7/0004 356/237.2 |
| 2014/0205180 A1* | 7/2014 | Chung | G06T 7/0006 382/149 |
| 2015/0110383 A1* | 4/2015 | Yang | G01N 21/956 382/145 |
| 2019/0333205 A1* | 10/2019 | Fang | G05B 19/406 |
| 2021/0090271 A1* | 3/2021 | Brauer | G06T 7/33 |

* cited by examiner

*Primary Examiner* — Pinalben Patel
(74) *Attorney, Agent, or Firm* — Lowenstein Sandler LLP

(57) ABSTRACT

There is provided a system and method of examining a specimen comprising a first layer and a second layer. The method comprises obtaining a recipe including a template image for each reference polygon in a reference image and a template mask indicative of proximity of a set of locations in the template image to an edge of the reference polygon; obtaining an inspection image in runtime; identifying first inspection polygons in the inspection image corresponding to the first reference polygons using template images and template masks thereof; determining a first shift for the first layer based on the first locations, and registering the first reference polygons with the inspection image based on the first shift. Similarly, a second shift for the second layer can be determined, and the second reference polygons can be registered with the inspection image based on the second shift.

20 Claims, 6 Drawing Sheets

SHAPE LOCALIZATION FOR EXAMINING A SEMICONDUCTOR SPECIMEN

TECHNICAL FIELD

The presently disclosed subject matter relates, in general, to the field of examination of a semiconductor specimen, and more specifically, to image registration for examining a specimen.

BACKGROUND

Current demands for high density and performance associated with ultra large-scale integration of fabricated devices require submicron features, increased transistor and circuit speeds, and improved reliability. As semiconductor processes progress, pattern dimensions, such as line width, and other types of critical dimensions, are continuously shrunken. Such demands require formation of device features with high precision and uniformity, which, in turn, necessitates careful monitoring of the fabrication process, including automated examination of the devices while they are still in the form of semiconductor wafers.

Examination can be provided by using non-destructive examination tools during or after manufacture of the specimen to be examined. Examination generally involves generating certain output (e.g., images, signals, etc.) for a specimen by directing light or electrons to the wafer and detecting the light or electrons from the wafer. A variety of non-destructive examination tools includes, by way of non-limiting example, scanning electron microscopes, atomic force microscopes, optical inspection tools, etc.

Examination processes can include a plurality of examination steps. The manufacturing process of a semiconductor device can include various procedures such as etching, depositing, planarization, growth such as epitaxial growth, implantation, etc. The examination steps can be performed a multiplicity of times, for example after certain process procedures, and/or after the manufacturing of certain layers, or the like. Additionally or alternatively, each examination step can be repeated multiple times, for example for different wafer locations, or for the same wafer locations with different examination settings.

Examination processes are used at various steps during semiconductor fabrication for performing metrology related operations and/or defect related operations. Effectiveness of examination can be improved by automatization of certain process(es) such as, for example, defect detection, Automatic Defect Classification (ADC), Automatic Defect Review (ADR), image segmentation, and automated metrology-related operations, etc. Automated examination systems ensure that the parts manufactured meet the quality standards expected and provide useful information on adjustments that may be needed to the manufacturing tools, equipment, and/or compositions, depending on the type of errors identified, so as to promote higher yield.

SUMMARY

In accordance with certain aspects of the presently disclosed subject matter, there is provided a computerized system of examining a semiconductor specimen comprising a first layer and a second layer, the system comprising a processing and memory circuitry (PMC) configured to obtain a recipe generated during recipe setup based on a reference image of the semiconductor specimen, the reference image having one or more first reference polygons representative of a first structure on the first layer and one or more second reference polygons representative of a second structure on the second layer annotated thereon, the recipe comprising a template image for each reference polygon of the first and second reference polygons extracted from the reference image, and a template mask associated with the template image and indicative of proximity of a set of locations in the template image to an edge of the reference polygon; obtain an inspection image of the semiconductor specimen in runtime; identify one or more first locations of one or more first inspection polygons in the inspection image corresponding to the one or more first reference polygons using template images of the first reference polygons and template masks associated therewith; determine a first shift for the first layer based on the one or more first locations, and register the first reference polygons with the inspection image based on the first shift; identify one or more second locations of one or more second inspection polygons in the inspection image corresponding to the one or more second reference polygons using template images of the second reference polygons and template masks associated therewith; and determine a second shift for the second layer based on the one or more second locations, and register the second reference polygons with the inspection image based on the second shift.

In addition to the above features, the system according to this aspect of the presently disclosed subject matter can comprise one or more of features (i) to (xii) listed below, in any desired combination or permutation which is technically possible:

(i). The one or more first reference polygons and the one or more second reference polygons are manually annotated by a user.

(ii). The template image is extracted from the reference image to enclose the reference polygon, and the template mask comprises a set of values corresponding to the set of locations in a predefined region of the template image, each value derived based on a distance between a respective location and a corresponding edge pixel of the reference polygon.

(iii). The inspection image and the reference image each comprises one or more perspective images captured from one or more perspectives of an examination tool.

(iv). The template image for a reference polygon of a specific layer is extracted from a perspective image with a selected perspective based on visibility of the specific layer in the one or more perspective images. The identifying one or more first locations and second locations are performed on respective perspective images in accordance with the selected perspective.

(v). The identification of the one or more first locations comprises matching, for each first inspection polygon, the template image and the associated template mask of a corresponding first reference polygon in a respective first search area in the inspection image.

(vi). The respective first search area for each first inspection polygon is defined based on a location of the corresponding first reference polygon and an expected maximal overlay offset.

(vii). The matching for each first inspection polygon comprises moving the template image and the associated template mask in the respective first search area at a step size and performing image correlation at each step, giving rise to a correlation map. A first location of the first inspection polygon is identified based on a position of a maximal value in the correlation map.

(viii). The identification of the one or more second locations comprises matching, for each second inspection polygon, the template image and the associated template mask of a corresponding second reference polygon in a respective second search area in the inspection image.

(ix). The respective second search area for each second inspection polygon is defined based on a location of the corresponding second reference polygon and an expected maximal overlay offset.

(x). The PMC is further configured to generate a visibility mask for the first layer representative of the registered first reference polygons. The identifying one or more second locations comprises associating the visibility mask with the inspection image, and matching, for each second inspection polygon, the template mask and the template image of a corresponding second reference polygon in a respective second search area in the inspection image associated with the visibility mask, thereby disregarding pixels in the registered first reference polygons.

(xi). The PMC is further configured to perform image segmentation on the inspection image based on the registered first and second reference polygons.

(xii). The PMC is further configured to obtain an overlay measurement based on the first shift and the second shift.

In accordance with other aspects of the presently disclosed subject matter, there is provided a method of a method of examining a semiconductor specimen comprising a first layer and a second layer, the method comprising: obtaining a recipe generated during recipe setup based on a reference image of the semiconductor specimen, the reference image having one or more first reference polygons representative of a first structure on the first layer and one or more second reference polygons representative of a second structure on the second layer annotated thereon, the recipe comprising: a template image for each reference polygon of the first and second reference polygons extracted from the reference image, and a template mask associated with the template image and indicative of proximity of a set of locations in the template image to an edge of the reference polygon; obtaining an inspection image of the semiconductor specimen in runtime; identifying one or more first locations of one or more first inspection polygons in the inspection image corresponding to the one or more first reference polygons using template images of the first reference polygons and template masks associated therewith; determining a first shift for the first layer based on the one or more first locations, and registering the first reference polygons with the inspection image based on the first shift; identifying one or more second locations of one or more second inspection polygons in the inspection image corresponding to the one or more second reference polygons using template images of the second reference polygons and template masks associated therewith; and determining a second shift for the second layer based on the one or more second locations, and registering the second reference polygons with the inspection image based on the second shift.

This aspect of the disclosed subject matter can comprise one or more of features (i) to (xii) listed above with respect to the system, mutatis mutandis, in any desired combination or permutation which is technically possible.

In accordance with other aspects of the presently disclosed subject matter, there is provided a non-transitory computer readable medium comprising instructions that, when executed by a computer, cause the computer to perform a method of examining a semiconductor specimen comprising a first layer and a second layer, the method comprising: obtaining a recipe generated during recipe setup based on a reference image of the semiconductor specimen, the reference image having one or more first reference polygons representative of a first structure on the first layer and one or more second reference polygons representative of a second structure on the second layer annotated thereon, the recipe comprising: a template image for each reference polygon of the first and second reference polygons extracted from the reference image, and a template mask associated with the template image and indicative of proximity of a set of locations in the template image to an edge of the reference polygon; obtaining an inspection image of the semiconductor specimen in runtime; identifying one or more first locations of one or more first inspection polygons in the inspection image corresponding to the one or more first reference polygons using template images of the first reference polygons and template masks associated therewith; determining a first shift for the first layer based on the one or more first locations, and registering the first reference polygons with the inspection image based on the first shift; identifying one or more second locations of one or more second inspection polygons in the inspection image corresponding to the one or more second reference polygons using template images of the second reference polygons and template masks associated therewith; and determining a second shift for the second layer based on the one or more second locations, and registering the second reference polygons with the inspection image based on the second shift.

This aspect of the disclosed subject matter can comprise one or more of features (i) to (xii) listed above with respect to the system, mutatis mutandis, in any desired combination or permutation which is technically possible.

BRIEF DESCRIPTION OF THE DRAWINGS

In order to understand the disclosure and to see how it may be carried out in practice, embodiments will now be described, by way of non-limiting example only, with reference to the accompanying drawings, in which.

DETAILED DESCRIPTION OF EMBODIMENTS

Figure 1:
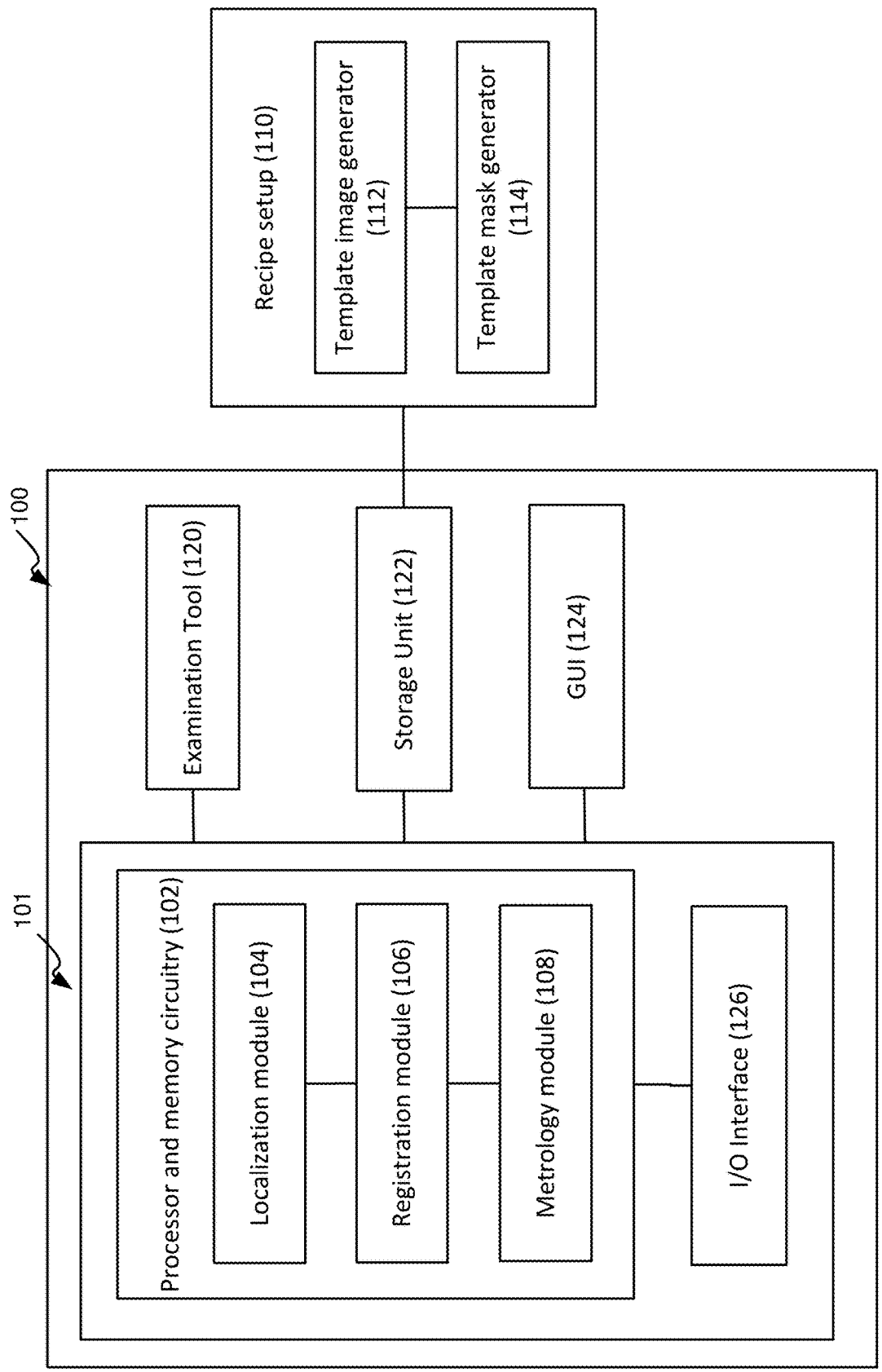
FIG. 1 illustrates a generalized block diagram of an examination system in accordance with certain embodiments of the presently disclosed subject matter.

In the following detailed description, numerous specific details are set forth in order to provide a thorough understanding of the disclosure. However, it will be understood by those skilled in the art that the presently disclosed subject matter may be practiced without these specific details. In other instances, well-known methods, procedures, components and circuits have not been described in detail so as not to obscure the presently disclosed subject matter.

Unless specifically stated otherwise, as apparent from the following discussions, it is appreciated that throughout the specification discussions utilizing terms such as "examining", "obtaining", "acquiring", "identifying", "determining", "localizing", "registering", "generating", "matching", "moving", "performing", "associating", "disregarding", or the like, refer to the action(s) and/or process(es) of a computer that manipulate and/or transform data into other data, said data represented as physical, such as electronic, quantities and/or said data representing the physical objects. The term "computer" should be expansively construed to cover any kind of hardware-based electronic device with data processing capabilities including, by way of non-limiting example, the examination system, the metrology system, the image registration system, and respective parts thereof disclosed in the present application.

The terms "non-transitory memory" and "non-transitory storage medium" used herein should be expansively construed to cover any volatile or non-volatile computer memory suitable to the presently disclosed subject matter. The terms should be taken to include a single medium or multiple media (e.g., a centralized or distributed database, and/or associated caches and servers) that store the one or more sets of instructions. The terms shall also be taken to include any medium that is capable of storing or encoding a set of instructions for execution by the computer and that cause the computer to perform any one or more of the methodologies of the present disclosure. The terms shall accordingly be taken to include, but not be limited to, a read only memory ("ROM"), random access memory ("RAM"), magnetic disk storage media, optical storage media, flash memory devices, etc.

The term "specimen" used in this specification should be expansively construed to cover any kind of physical objects or substrates including wafers, masks, reticles, and other structures, combinations and/or parts thereof used for manufacturing semiconductor integrated circuits, magnetic heads, flat panel displays, and other semiconductor-fabricated articles. A specimen is also referred to herein as a semiconductor specimen, and can be produced by manufacturing equipment executing corresponding manufacturing processes.

The term "examination" used in this specification should be expansively construed to cover any kind of operations related to defect detection, defect review and/or defect classification of various types, segmentation, and/or metrology operations during and/or after the specimen fabrication process. Examination is provided by using non-destructive examination tools during or after manufacture of the specimen to be examined. By way of non-limiting example, the examination process can include runtime scanning (in a single or in multiple scans), imaging, sampling, detecting, reviewing, measuring, classifying and/or other operations provided with regard to the specimen or parts thereof, using the same or different inspection tools. Likewise, examination can be provided prior to manufacture of the specimen to be examined, and can include, for example, generating an examination recipe(s) and/or other setup operations. It is noted that, unless specifically stated otherwise, the term "examination" or its derivatives used in this specification are not limited with respect to resolution or size of an inspection area. A variety of non-destructive examination tools includes, by way of non-limiting example, scanning electron microscopes (SEM), atomic force microscopes (AFM), optical inspection tools, etc.

The term "metrology operation" used in this specification should be expansively construed to cover any metrology operation procedure used to extract metrology information relating to one or more structural elements on a semiconductor specimen. In some embodiments, the metrology operations can include measurement operations, such as, e.g., critical dimension (CD) measurements performed with respect to certain structural elements on the specimen, including but not limiting to the following: dimensions (e.g., line widths, line spacing, contact diameters, size of the element, edge roughness, gray level statistics, etc.), shapes of elements, distances within or between elements, related angles, overlay information associated with elements corresponding to different design levels, etc. Measurement results such as measured images are analyzed, for example, by employing image-processing techniques. Note that, unless specifically stated otherwise, the term "metrology" or derivatives thereof used in this specification are not limited with respect to measurement technology, measurement resolution, or size of inspection area.

The term "defect" used in this specification should be expansively construed to cover any kind of abnormality or undesirable feature/functionality formed on a specimen. In some cases, a defect may be a defect of interest (DOI) which is a real defect that has certain effects on the functionality of the fabricated device, thus is in the customer's interest to be detected. For instance, any "killer" defects that may cause yield loss can be indicated as a DOI. In some other cases, a defect may be a nuisance (also referred to as "false alarm" defect) which can be disregarded because it has no effect on the functionality of the completed device and does not impact yield.

The term "design data" used in the specification should be expansively construed to cover any data indicative of hierarchical physical design (layout) of a specimen. Design data can be provided by a respective designer and/or can be derived from the physical design (e.g., through complex simulation, simple geometric and Boolean operations, etc.). Design data can be provided in different formats as, by way of non-limiting examples, GDSII format, OASIS format, etc. Design data can be presented in vector format, grayscale intensity image format, or otherwise.

It is appreciated that, unless specifically stated otherwise, certain features of the presently disclosed subject matter, which are described in the context of separate embodiments, can also be provided in combination in a single embodiment. Conversely, various features of the presently disclosed subject matter, which are described in the context of a single embodiment, can also be provided separately or in any suitable sub-combination. In the following detailed description, numerous specific details are set forth in order to provide a thorough understanding of the methods and apparatus.

Bearing this in mind, attention is drawn to FIG. 1 illustrating a functional block diagram of an examination system in accordance with certain embodiments of the presently disclosed subject matter.

The examination system 100 illustrated in FIG. 1 can be used for examination of a semiconductor specimen (e.g., a wafer, a die, or parts thereof) as part of the specimen fabrication process. As described above, the examination referred to herein can be construed to cover any kind of operations related to defect inspection/detection, defect classification, segmentation, and/or metrology operations, such as, e.g., critical dimension (CD) measurements, overlay, etc., with respect to the specimen. System 100 comprises one or more examination tools 120 configured to scan a specimen and capture images thereof to be further processed for various examination applications.

The term "examination tool(s)" used herein should be expansively construed to cover any tools that can be used in examination-related processes including, by way of non-limiting example, scanning (in a single or in multiple scans), imaging, sampling, reviewing, measuring, classifying and/or other processes provided with regard to the specimen or parts thereof.

Without limiting the scope of the disclosure in any way, it should also be noted that the examination tools 120 can be implemented as inspection machines of various types, such as optical inspection machines, electron beam inspection machines (e.g., Scanning Electron Microscope (SEM), Atomic Force Microscopy (AFM), or Transmission Electron Microscope (TEM), etc.), and so on. In some cases, the same examination tool can provide low-resolution image data and high-resolution image data. The resulting image data (low-resolution image data and/or high-resolution image data) can be transmitted—directly or via one or more intermediate systems—to system 101. The present disclosure is not limited to any specific type of examination tools and/or the resolution of image data resulting from the examination tools.

In some embodiments, at least one of the examination tools 120 has metrology capabilities and can be configured to capture images and perform metrology operations on the captured images. Such an examination tool is also referred to herein as a metrology tool.

According to certain embodiments, the metrology tool can be an electron beam tool, such as, e.g., scanning electron microscopy (SEM). SEM is a type of electron microscope that produces images of a specimen by scanning the specimen with a focused beam of electrons. The electrons interact with atoms in the specimen, producing various signals that contain information on the surface topography and/or composition of the specimen. SEM is capable of accurately measuring features during the manufacture of semiconductor wafers. By way of example, the metrology tool can be critical dimension scanning electron microscopes (CD-SEM) configured to perform metrology operations with respect to of structural features of a specimen based on the captured images.

It is to be noted that, the term "image(s)" used herein can refer to original images of the specimen captured by the examination tool during the manufacturing process, derivatives of the captured images obtained by various pre-processing stages, and/or computer-generated design data-based images. It is to be noted that in some cases the images referred to herein can include image data (e.g., captured images, processed images, etc.) and associated numeric data (e.g., metadata, hand-crafted attributes, etc.). It is further noted that image data can include data related to one or more layers of interest of the specimen.

The process of semiconductor manufacturing often requires fabricating a series of layers, at least some of which comprise various structural features (also referred to as structures or features) manufactured by one or more processing steps (also referred to as process steps). A structural feature can refer to an element or module to be manufactured on a layer that has a specific designed structure and functionality. Metrology operations can be performed at various processing steps during the manufacturing process to provide measurements for purposes of monitoring and controlling the process. Such measurements can include, such as, e.g., critical dimension (CD) measurements, overlay measurements, CD uniformity (CDU) measurements, etc.

In some cases, the measurements can be obtained based on image segmentation which delivers critical information on the shapes and dimensions of the structural features in the images. For instance, the images of different layers can be segmented for purpose of identifying the edges of the structural features thereof, and measurements can be derived based on the relative positions of the identified edges. In such cases, the quality of the measurements largely depends on the performance of the image segmentation, which may in turn rely on proper image registration. By way of example, a global image registration between an inspection image and a reference image can be performed to assist in locating coarse positions of certain structural features from the reference image in the inspection image, based on which fine segmentation can be further performed.

The term "registration" or "image registration" used in the specification should be expansively construed to cover any matching between two images for purpose of correcting a shift/offset between the two images. For instance, through the registration it can be determined how one image should be altered, e.g., shifted or deformed to correspond to the other image.

Registration between an inspection image and a reference image may present various difficulties and challenges, such as feature mismatch, inability to locate certain features at expected locations, size mismatch, color or shade mismatch, or the like. The problems may be caused by certain variations occurred during the manufacturing process and/or imaging process, such as process variations, color variations, navigation errors, and/or other problems which may affect the validity and accuracy of registration.

In particular, image registration can be affected in cases where the images present multiple layers of structures of a specimen and there is an overlay error between the layers. The misalignment between structural features on different layers of a specimen is referred to as overlay, or overlay error. When an overlay error is present between two layers, the first layer of structures is typically shifted from the second layer of structures (with respect to their expected relative position). The shift between the first and second layers may be imaged and measured. If the shift does not match the expected relative position, the amount of variance from the relative position corresponds to the overlay error.

There is a need to control overlay between various layers or within particular layers of a specimen, as the relative position of certain structural features in various layers can be critical to the device performance. The overlay error must be well measured such that the performance of the relevant processing steps can be controlled based on the measurements. For instance, if certain overlay measurements of the specimen are unacceptable (e.g., exceeding a predetermined tolerance range or threshold), such measurements may be used to alter one or more parameters of the processing steps such that subsequent specimens manufactured by the processing steps can have acceptable overlay characteristics.

Using traditional image registration such as a global image registration may result in unsuccessful/invalid registration in such cases, as certain features cannot be properly located in the images due to the overlay between the layers. An invalid registration will cause a corresponding measurement to fail or yield an incorrect result.

Accordingly, certain embodiments of the presently disclosed subject matter propose a method and system capable of accurately localizing the structural features (i.e., shape localization) in different layers and providing improved image registration in particular with respect to presence of overlay, as will be detailed below.

According to certain embodiments of the presently disclosed subject matter, the examination system 100 comprises a computer-based system 101 operatively connected to the examination tools 120 and capable of shape localization and image registration for images of a semiconductor specimen during specimen fabrication. System 101 is also referred to as an image registration system. In some cases, system 101 can be further configured to perform additional metrology operations based on the registered images. In such cases, system 101 can be also referred to as a metrology system.

Specifically, system 101 includes a processor and memory circuitry (PMC) 102 operatively connected to a hardware-based I/O interface 126. The PMC 102 is configured to provide processing necessary for operating the system as further detailed with reference to FIGS. 2, 3 and 4 and comprises a processor (not shown separately) and a memory (not shown separately). The processor of PMC 102 can be configured to execute several functional modules in accordance with computer-readable instructions implemented on a non-transitory computer-readable memory comprised in the PMC. Such functional modules are referred to hereinafter as comprised in the PMC.

The processor referred to herein can represent one or more general-purpose processing devices such as a microprocessor, a central processing unit, or the like. More particularly, the processor may be a complex instruction set computing (CISC) microprocessor, a reduced instruction set computing (RISC) microprocessor, a very long instruction word (VLIW) microprocessor, a processor implementing other instruction sets, or processors implementing a combination of instruction sets. The processor may also be one or more special-purpose processing devices such as an application specific integrated circuit (ASIC), a field programmable gate array (FPGA), a digital signal processor (DSP), a network processor, or the like. The processor is configured to execute instructions for performing the operations and steps discussed herein.

The memory referred to herein can comprise a main memory (e.g., read-only memory (ROM), flash memory, dynamic random access memory (DRAM) such as synchronous DRAM (SDRAM) or Rambus DRAM (RDRAM), etc.), and a static memory (e.g., flash memory, static random access memory (SRAM), etc.).

Functional modules comprised in the PMC 102 of system 101 can include a localization module 104, a registration module 106 and optionally a metrology module 108. The PMC 102 can be configured to obtain, from a storage unit 122, a recipe generated during recipe setup and usable for localizing structural features during runtime. In some embodiments, the recipe can be generated in a recipe setup system 110 based on a reference image of the semiconductor specimen. The reference image has one or more first reference polygons representative of a first structure on the first layer and one or more second reference polygons representative of a second structure on the second layer annotated thereon.

The recipe setup system 110 can comprise a PMC (not illustrated in the figure) including functional modules such as a template image generator 112 and a template mask generator 114. The template image generator 112 can be configured to extract a template image for each reference polygon of the first and second reference polygons from the reference image. The template mask generator 114 can be configured to generate a template mask associated with the template image and indicative of proximity of a set of locations in the template image to an edge of the reference polygon. The template image and the template mask, upon generation, constitute the recipe.

The PMC 102 can be configured to obtain, via the I/O interface 126 and from the examination tool 120 (e.g., a metrology tool), an inspection image of the semiconductor specimen in runtime. The localization module 104 can be configured to identify one or more first locations of one or more first inspection polygons in the inspection image corresponding to the one or more first reference polygons using template images of the first reference polygons and template masks associated therewith. The registration module 106 can be configured to determine a first shift for the first layer based on the one or more first locations, and register the first reference polygons with the inspection image based on the first shift.

The localization module 104 can be further configured to identify one or more second locations of one or more second inspection polygons in the inspection image corresponding to the one or more second reference polygons using template images of the second reference polygons and template masks associated therewith. The registration module 106 can be configured to determine a second shift for the second layer based on the one or more second locations, and register the second reference polygons with the inspection image based on the second shift. Optionally, the metrology module 108 can be configured to perform additional metrology operations based on the registered images.

Operation of systems 100, 101, 110, and the PMC(s) thereof, as well as the functional modules therein will be further detailed with reference to FIGS. 2-4.

In some cases, additionally to system 101, the examination system 100 can comprise one or more examination modules, such as, e.g., defect detection module and/or Automatic Defect Review Module (ADR) and/or Automatic Defect Classification Module (ADC) and/or an additional metrology-related module and/or other examination modules which are usable for examination of a semiconductor specimen. The one or more examination modules can be implemented as stand-alone computers, or their functionalities (or at least part thereof) can be integrated with the examination tool 120. In some cases, the output of system 101 such as, e.g., the registered images, and/or metrology outputs can be provided to the one or more examination modules for further processing.

According to certain embodiments, system 101 can comprise a storage unit 122. The storage unit 122 can be configured to store any data necessary for operating system 101, e.g., data related to input and output of system 101, as well as intermediate processing results generated by system 101. By way of example, the storage unit 122 can be configured to store images of the specimen and/or derivatives thereof produced by the examination tool 120. In some cases, the storage unit 122 can be configured to store the recipe generated by the recipe setup system 110, including the template images and template masks generated for a reference image. Accordingly, the images and recipe can be retrieved from the storage unit 122 and provided to the PMC 102 for further processing. The output of the system 101, such as the registered images and/or the metrology outputs, can be sent to storage unit 122 to be stored.

In some embodiments, system 100 can optionally comprise a computer-based Graphical User Interface (GUI) 124 which is configured to enable user-specified inputs related to system 101. For instance, the user can be presented with a visual representation of the specimen (for example, by a display forming part of GUI 124), including image data of the specimen. The user may be provided, through the GUI, with options of defining certain operation parameters, such as, e.g., region of interest (ROI) on the images, layer visibility per channel, etc. The user can also annotate the reference image via the GUI, e.g., by drawing reference polygons manually on the reference image. The user may also view the operation results, such as, e.g., the localized polygons, the registered images, etc., on the GUI.

In some cases, system 101 can be further configured to send, via I/O interface 126, the output data to one or more of the examination tools 120 and/or the one or more examination modules as described above for further processing. In some cases, system 101 can be further configured to send certain output data to the storage unit 122, and/or external systems (e.g., Yield Management System (YMS) of a fabrication plant (FAB)).

Those versed in the art will readily appreciate that the teachings of the presently disclosed subject matter are not bound by the system illustrated in FIG. 1; equivalent and/or modified functionality can be consolidated or divided in another manner and can be implemented in any appropriate combination of software with firmware and/or hardware.

It is noted that the system illustrated in FIG. 1 can be implemented in a distributed computing environment, in which the aforementioned components and functional modules shown in FIG. 1 can be distributed over several local and/or remote devices, and can be linked through a communication network. For instance, the examination tool 120 and the system 101 can be located at the same entity (in some cases hosted by the same device) or distributed over different entities.

It is further noted that in some embodiments at least some of examination tools 120, storage unit 122 and/or GUI 124 can be external to the examination system 100 and operate in data communication with systems 100 and 101 via I/O interface 126. System 101 can be implemented as stand-alone computer(s) to be used in conjunction with the examination tools, and/or with the additional examination modules as described above. Alternatively, the respective functions of the system 101 can, at least partly, be integrated with one or more examination tools 120, thereby facilitating and enhancing the functionalities of the examination tools 120 in examination-related processes.

Although it is illustrated in FIG. 1 that the recipe setup system 110 and the examination system 100 are separate systems, this is not necessarily so. In some cases the functionalities of system 110 can be at least partly integrated with system 100. By way of example, the function modules of system 110 can be incorporated into the PMC 102 in system 101. In such cases, system 101 can serve as a recipe setup system during setup phase, and serve as an image registration system during runtime using the recipe generated during setup.

Figure 2:
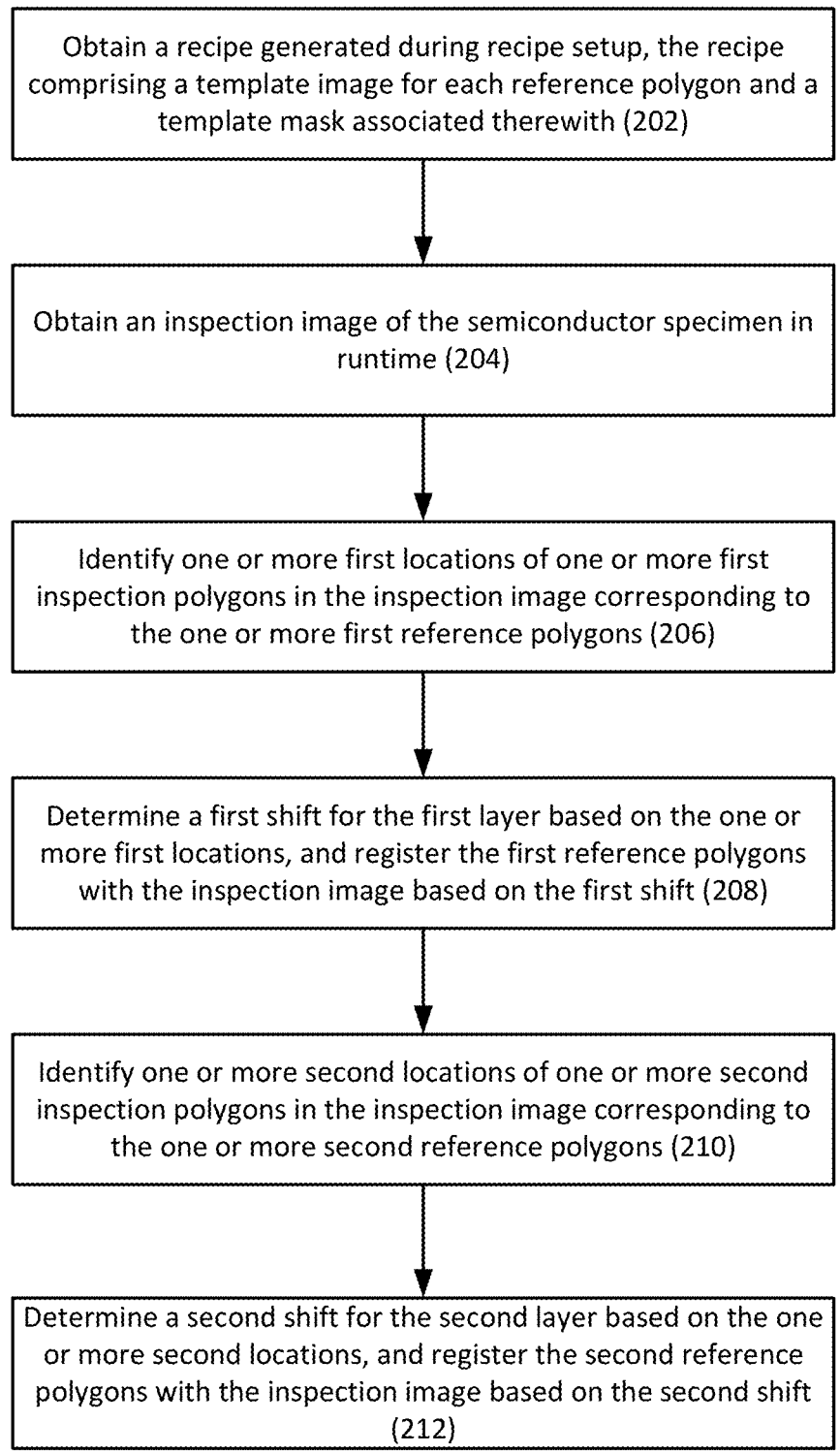
FIG. 2 illustrates a generalized flowchart of examining a semiconductor specimen comprising a first layer and a second layer in accordance with certain embodiments of the presently disclosed subject matter.
Figure 3:
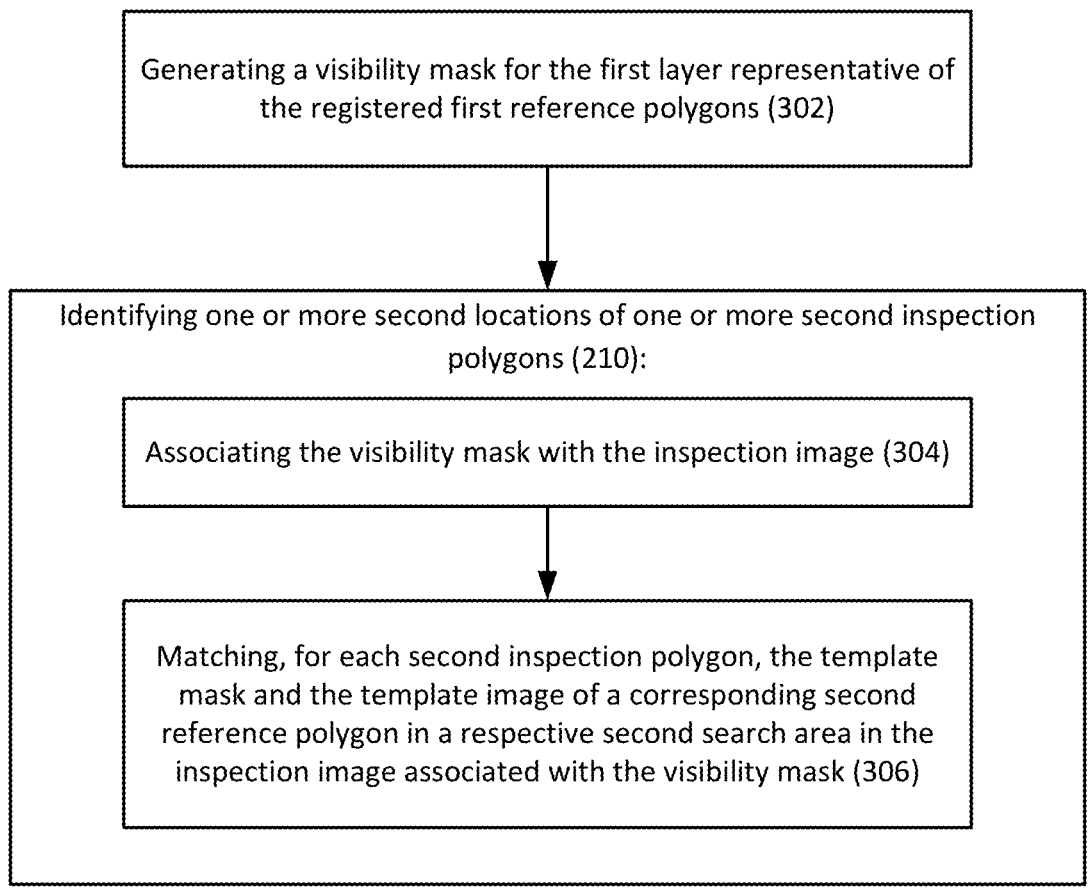
FIG. 3 illustrates a generalized flowchart of using the visibility mask during the identification of the second inspection polygons in accordance with certain embodiments of the presently disclosed subject matter.
Figure 4:
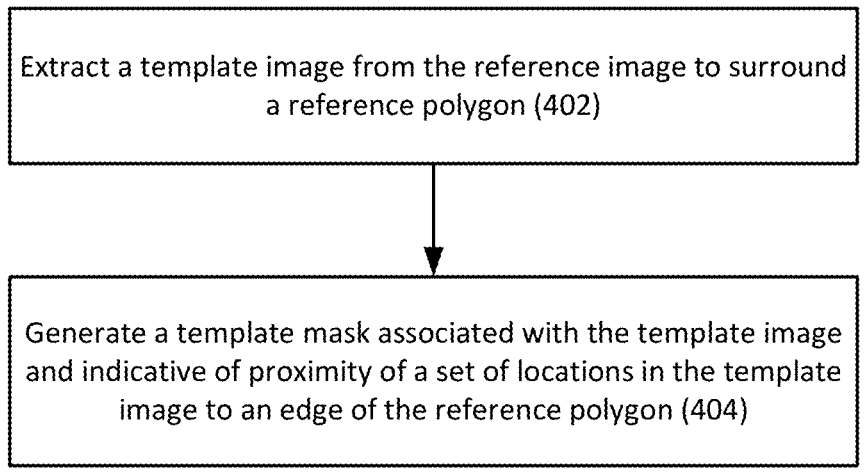
FIG. 4 illustrates a generalized flowchart of generating a recipe usable for shape localization in accordance with certain embodiments of the presently disclosed subject matter.

While not necessarily so, the process of operation of systems 101 and 100 can correspond to some or all of the stages of the methods described with respect to FIGS. 2-4. Likewise, the methods described with respect to FIGS. 2-4 and their possible implementations can be implemented by systems 101 and 100. It is therefore noted that embodiments discussed in relation to the methods described with respect to FIGS. 2-4 can also be implemented, mutatis mutandis as various embodiments of the systems 101 and 100, and vice versa.

Referring to FIG. 2, there is illustrated a generalized flowchart of examining a semiconductor specimen comprising a first layer and a second layer in accordance with certain embodiments of the presently disclosed subject matter.

It is proposed in the present disclosure that instead of, or in addition to, a global image registration which directly registers a reference image with a runtime inspection image, structural features in the inspection image can be respectively localized and used to determine a more accurate shift with respect to the reference. The structural features are localized using templates previously generated for corresponding structural features in the reference image, as detailed below.

Specifically, a recipe can be previously generated during reference setup based on a reference image of the semiconductor specimen. As the specimen comprises a first layer and a second layer, the reference image should be representative of the structures from both layers such that annotations of the structures of both layers can be provided accordingly. By way of example, one or more first reference polygons representative of a first structure (i.e., first structural features on the first layer) on the first layer and one or more second reference polygons representative of a second structure (i.e., second structural features on the second layer) on the second layer can be annotated on the reference image. In some embodiments, the one or more first reference polygons and the one or more second reference polygons can be manually annotated by a user. For instance, the user manually draws a model including the polygons representative of the shapes of the first structural features and the second structural features on the reference image. In some other embodiments, the reference polygons can be automatically extracted and then verified/corrected by a user.

In some embodiments, the reference image can comprise one or more perspective images captured from one or more perspectives of the examination tool. By way of example, in cases where the examination tool is SEM, different perspective images can be acquired from external and internal perspectives (also referred to as secondary electron (SE) and backscattered electron (BSE) perspectives). In some cases, due to various factors such as location, materials, thickness of the layers, etc., certain structures of a given layer may only appear in images from a specific perspective. In some cases, images from a given perspective may show presence of multiple layer structures. In some embodiments, a user can provide configuration parameters (e.g., via the GUI 124) indicative of visibility of different layer structures in different perspective images. For instance, the user may tick, for each layer, the perspective(s) in which the layer structures are visible, in the system configuration settings.

Thus, the reference image referred to herein should be broadly construed to cover one or more of the perspective images (or combinations thereof) that contain information of the layers of interest. For instance, the reference image can be an image acquired from an internal perspective of SEM, which has presence of both the first layer and the second layer. In another example, the reference image can include one or more images acquired from external perspectives (or a sum thereof) where there is presence of the first layer, and one or more images acquired from an internal perspective where there is presence of at least the second layer. In the latter case, optionally, the reference image can be a combined image generated by combining all the included images. The present disclosure is not limited to the number of images included in the reference image and/or the perspectives/channels that the images are acquired from.

Turning now to FIG. 4, there is illustrated a generalized flowchart of generating a recipe usable for shape localization in accordance with certain embodiments of the presently disclosed subject matter.

A template image for each reference polygon of the first and second reference polygons can be extracted (402) (e.g., by the template image generator 112) from the reference image. A template mask associated with the template image can be generated (404) (e.g., by the template image generator 114), the template mask being indicative of proximity of a set of locations in the template image to an edge of the reference polygon.

Figure 5:
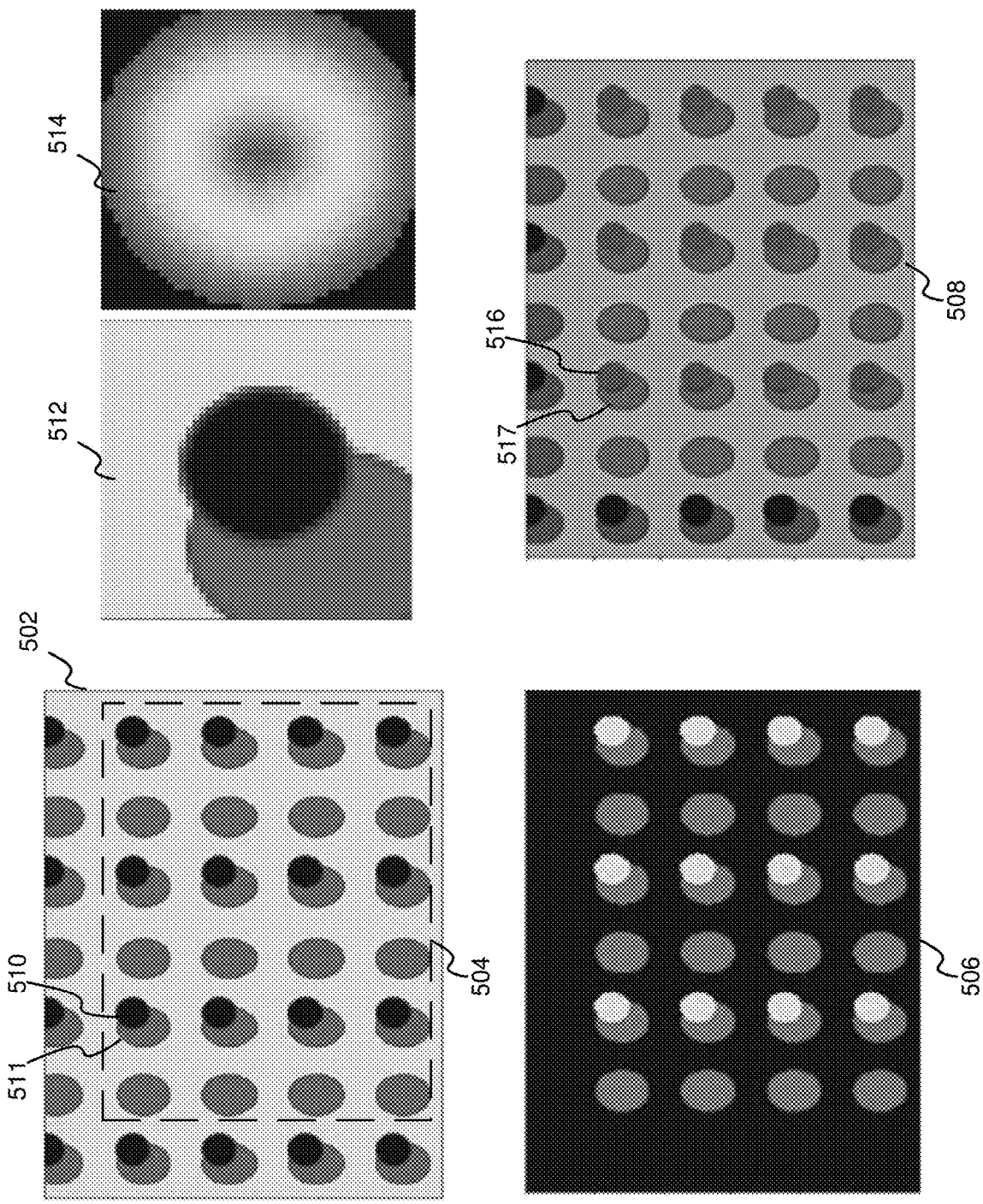
FIG. 5 illustrates an example of a reference image and a template image and template mask generated therefor in accordance with certain embodiments of the presently disclosed subject matter.

FIG. 5 illustrates an example of a reference image, and a template image and template mask generated therefor in accordance with certain embodiments of the presently disclosed subject matter.

The reference image 502 is representative of two structures from two layers: the circle structures (referred to as first structures in the example) from a first layer and the ellipse structures (referred to as the second structures in the example) from a second layer. The two structures have a fixed relative position, i.e., each circle is partially overlapped with an adjacent ellipse at the upper right side of the ellipse, as illustrated. As described above, the reference image can be an image acquired from a specific perspective which captures both layers. Alternatively, the reference image can be regarded as comprising two images from different perspectives, each capturing a respective layer, or as a combined image of such two images.

In the present example, a region of interest (ROI) 504 is selected, the structures in which will be annotated. For instance, a user can provide annotation by drawing a model 506 representative of the structures in the ROI of the reference image. The model 506 includes first and second reference polygons representative of the first and second structures enclosed in the ROI. The model 506 can be applied on the reference image 502, giving rise to an annotated reference image 508.

A template image for each reference polygon can be extracted from the reference image 502 based on the annotation (e.g., the annotated reference image 508). For instance, for the first circle structure 510, a template image 512 (e.g., an image patch, which is enlarged in the figure for better illustration) enclosing the structure can be extracted from the reference image 502 based on the location of the reference polygon 516 that the user drew for the circle structure 510. For instance, the template image can be centered around the center of the polygon 516, and the size of the template image can be predetermined, e.g., based on one or more of the following: the size of the circle structure, a per-layer parameter indicative of an edge area of interest of the circle structure, and the distance with neighboring structures, etc.

A template mask 514 can be generated corresponding to the template image 512. The template mask 514 is indicative of proximity of a set of locations/pixels in the template image 512 to an edge/contour of the reference polygon 516. By way of example, the template mask comprises a set of values (represented by gray level values in the mask) corresponding to the set of locations in a predefined region of the template image. In the present example, the predefined region is a circular region along the edge of the reference polygon. For each location in the region, a distance between the location and a corresponding edge pixel of the reference polygon can be derived and used for providing a value for the corresponding location in the template mask. By way of example, multiple strips (not illustrated) perpendicular/normal to the edge of the reference polygon can be plotted, and a mathematical distribution (such as, e.g., a Gaussian distribution) can be used to derive the values along the strip, based on the distance between each pixel of the strip and the edge of the polygon. For instance, for locations/coordinates which are right on the edge of the polygon, or in close proximity thereto, the distance therebetween will be zero or close to zero, whereas for locations which are further away from the edge, the distance will be greater.

It is to be noted that the term "mask" or "masking" used herein should be expansively construed to cover any manner of disregarding one or more pixels of an image. By way of example, the pixels to be masked out can be assigned with a neutral value (such as a value of 0), which does not affect any further operations performed upon the remaining pixels. In some cases, the pixels to be masked out can remain unchanged, or set to any arbitrary value or values that the further operation/computation may ignore and consider only the non-masked pixels. It will be appreciated that masking can take other forms as well, depending on the specific implementation used.

In the present case, as the template mask is to be used together with the template image for matching in the inspection image, the masking can be performed by, e.g., replacing the relevant pixel values in the image with a neutral value (e.g., a value of 0) that does not affect the matching, or by indicating the pixel locations, for example storing the pixel locations in a data structure to be considered in the matching, or in any other suitable manner.

By using Gaussian distribution (e.g., applying a Gaussian mask on the distances), higher weights can be applied to locations/coordinates with closer distances to the edges so as to emphasize the pixels in close proximity to the edge/contour of the polygon, as compared to coordinates that are more distant to the edge/contour. Coordinates that are even further away (such as the locations closer to the corner of the template image, or closer to the center of the image) can be assigned with the value of zero. It is to be noted that Gaussian distribution is used as one possible example for implementation. Any other mathematical distribution that can be used to apply various weights based on distances can be applied in lieu of the Gaussian distribution.

Similarly, a template image and template mask can be generated for each reference polygon in the first layer and the second layer. As described above, the reference image may comprise one or more perspective images or a combination thereof. In some cases, the template image for a reference polygon of a specific layer can be extracted from a perspective image selected, e.g., by a user based on the visibility of the specific layer in different perspectives.

By way of example, in cases where the reference image includes one or more images acquired from external perspectives (or a sum thereof) where there is presence of the first layer, and one or more images acquired from an internal perspective where there is presence of both layers, the template image for a reference polygon of the first layer can be selected to be extracted from the external image(s)

(which has a better visibility of the first layer as compared to the internal image(s)). The template image for a reference polygon of the second layer can be selected to be extracted from the internal image(s) (as this is the only perspective that has information of the second layer). In cases where the reference image includes only one perspective image which has presence of both the first layer and the second layer, the template images for reference polygons from both layers will be extracted from the same perspective.

Figure 7:
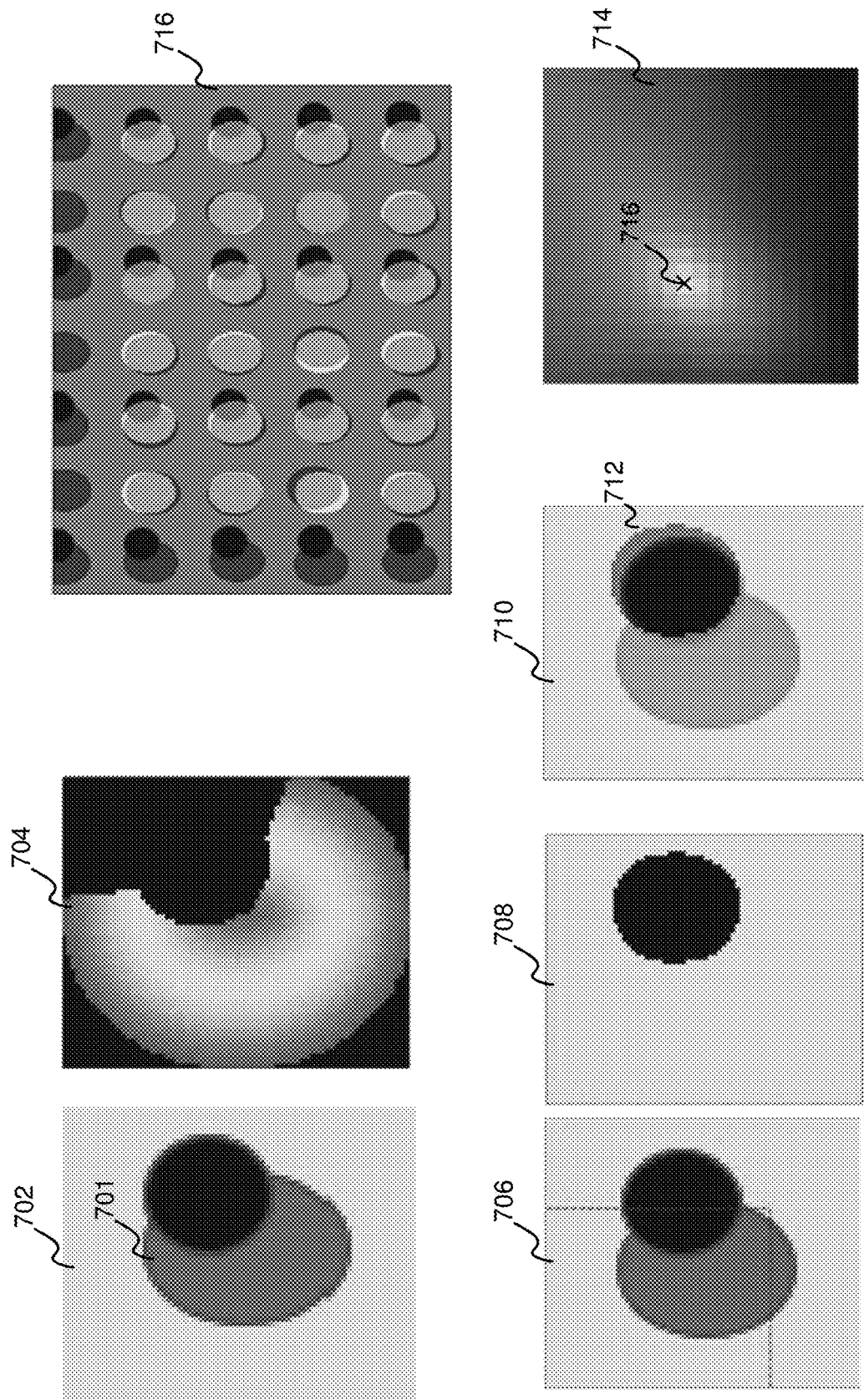
FIG. 7 illustrates an example of shape localization and registration of the second layer in accordance with certain embodiments of the presently disclosed subject matter.

Similarly, a template image and template mask are generated for the second reference polygons in the second layer as exemplified in reference image 502. An example of a generated template image and template mask is illustrated in FIG. 7, as will be detailed below.

Once all template images and masks are generated based on the reference image, the generated template images and masks constitute a recipe which can be stored in the storage unit and used in runtime examination, as described below with reference to FIG. 2.

Continuing with the description of FIG. 2, an inspection image of the semiconductor specimen can be obtained (204) (e.g., by the PMC 102 via the I/O interface 126) in runtime. The inspection image can be acquired by the examination tool 120 (e.g., a metrology tool) during runtime examination of the specimen. The inspection image and the reference image can result from various examination modality(s), such as, e.g., by an optical inspection tool, an electron beam tool, etc., and the present disclosure is not limited by the specific examination modality used for acquiring the image.

Similar to the reference image, the inspection image can comprise one or more perspective images captured from one or more perspectives of the examination tool. Specifically, the inspection image can correspond to the reference image and can comprise the same perspective images (i.e., images captured from the same perspective) as of the reference image. By way of example, in cases where the reference image is an image acquired from a specific perspective which captures both the first layer structure and the second layer structure, the inspection image is acquired from the same perspective. In cases where the reference image comprises two images from different perspectives each capturing a respective layer, or comprises a combined image of such two images, the inspection image can have the same composition.

One or more first locations of one or more first inspection polygons in the inspection image corresponding to the one or more first reference polygons can be identified (206) (e.g., by the localization module 104 in PMC 102) using template images of the first reference polygons and template masks associated therewith. In some embodiments, the one or more first locations of the one or more first inspection polygons can be identified by matching, for each first inspection polygon, the template image and the associated template mask of a corresponding first reference polygon in a respective first search area in the inspection image. By way of example, the respective first search area for each first inspection polygon can be defined based on at least a location of the corresponding first reference polygon. It is noted that the one or more first inspection polygons can be identified from image(s) captured from the same perspective as of the reference image from which the template images of the first reference polygons are extracted.

Figure 6:
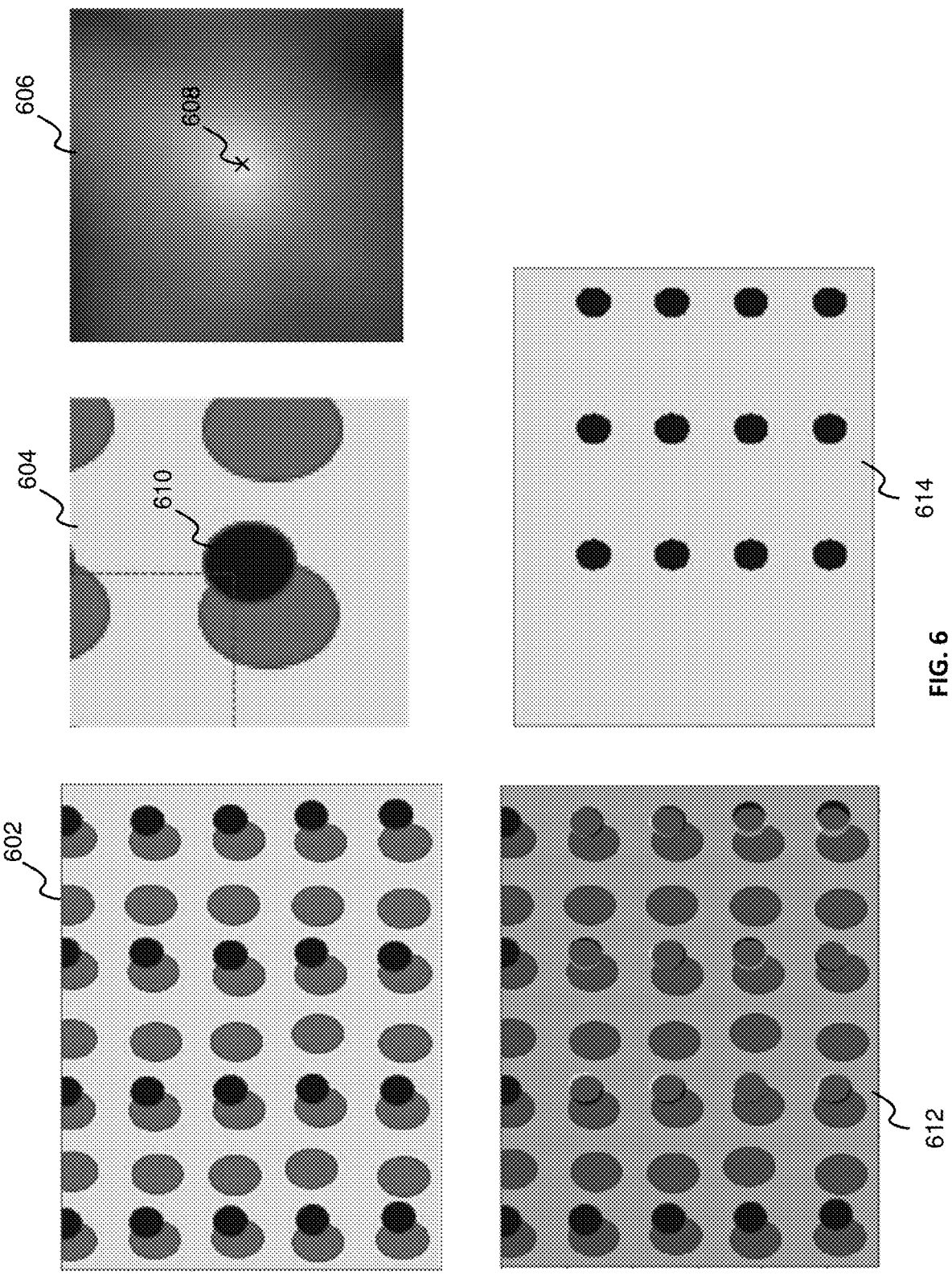
FIG. 6 illustrates an example of an inspection image and shape localization and registration of the first layer in accordance with certain embodiments of the presently disclosed subject matter.

FIG. 6 illustrates an example of an inspection image and shape localization and registration of the first layer in accordance with certain embodiments of the presently disclosed subject matter.

The exemplified inspection image 602 is a runtime image corresponding to the reference image 502. As shown, as compared to the relative position between the circle and the ellipse structures in reference image 502, there appears to be a slight shift of the circle structures to the right with respect to the ellipse structures, which may be caused due to overlay between the two layers, as described above.

In order to identify the first inspection polygons in the inspection image 602 that correspond to the first reference polygons (i.e., the circle structures of the first layer) in the reference image 502, the template images and template masks generated for the first reference polygons during recipe setup are used. Specifically, by way of example, for the first reference polygon 516 corresponding to the circle structure 510, the template image 512 and template mask 514 generated therefor can be used for identifying the corresponding first inspection polygon in the inspection image 602.

By way of example, a first search area for the first inspection polygon can be defined on the inspection image 602 based on the location of the corresponding first reference polygon 516. In some cases, the localization of the first inspection polygons can be performed following a global image registration which corrects a navigation error (i.e., expected tool navigation drift between capturing the reference image and capturing the inspection image). In such cases, the first search area can be centered around the center of the reference polygon 516, and the size of the search area can be predetermined, e.g., based on the expected maximal overlay offset. For instance, the expected maximal overlay offset can be predefined, e.g., based on previous overlay data for the same layers of the same type of specimen. In some other cases where the global image registration is not performed in advance, the location of the search area can be defined based on the location of the corresponding first reference polygon and an estimated navigation error. Similarly, the size of the search area in such cases can be predetermined based on the expected maximal overlay offset.

An example of a first search area 604 for the first inspection polygon is magnified for purpose of better illustration. The template image 512 and template mask 514 can be associated (e.g., by overlaying the template mask on the template image) and used for matching in the search area 604 for purpose of identifying the corresponding inspection polygon.

By way of example, the matching can be performed by moving the template image 512 and the associated template mask 514 in the first search area 604 at a step size (e.g., the template image and mask can move as a sliding box in the search area 604, as exemplified by the dashed line square in 604), and performing image correlation at each step (e.g., correlation between the associated template image and mask, and the image portion in the search area that is presently covered by the template image and mask). In one example, the matching can be performed using zero normalized cross-correlation.

Once the template image and mask traverse the entire search area, a correlation map 606 can be generated based on the correlation result of each step. The correlation map represents the similarity between the template image and mask with respect to each image portion along the traverse of the search area. In one example, the position of the maximal value 608 in the correlation map 606 can be identified to correspond to the location of the first inspection polygon 610. Similarly, the remaining first inspection polygons in the inspection image 602 can be identified in a similar manner as of the identification of the inspection polygon 610.

In some embodiments, once the first locations of the first inspection polygons in the inspection image are identified, a first shift for the first layer can be determined (208) (e.g., by the registration module 106 in PMC 102) based on the one or more first locations. By way of example, the identified first locations of the first inspection polygons can be respectively compared with the locations of the corresponding reference polygons, giving rise to respective shifts therebetween. The first shift can be derived based on statistics of the respective shifts. For instance, the first shift can be an average of the respective shifts, where any type of averaging technique, such as mean, median, etc., with or without weights, can be applied.

The first shift, once obtained, can be regarded as a per-layer shift. The first reference polygons can be registered with the inspection image based on the first shift. By way of example, the first reference polygons (e.g., as the user annotated on the reference image) can be placed/overlayed on the inspection image based on the first shift. FIG. 6 illustrates an example of a registered first layer 612, where the first referenced polygons (such as the polygon 516) are overlayed on the inspection image 602, representing the identified and registered first inspection polygons.

In some other embodiments, alternatively, once the first locations of the first inspection polygons in the inspection image are identified, each first inspection polygon can be registered separately with the corresponding reference polygon based on the respective shift therebetween. For instance, each first reference polygon can be respectively overlayed on the inspection image based on the respective shift to represent the corresponding inspection polygon as identified in the inspection image.

In some cases, optionally, a visibility mask can be generated for the first layer representative of the registered first reference polygons. By way of example, the visibility mask can be a binary mask where the pixels of the registered first reference polygons are assigned with a value of 1, and the remaining pixels are assigned with a value of 0. Alternatively, in some cases the pixels of the registered first reference polygons can be assigned with a value of 0, and the remaining pixels can be assigned with a value of 1, depending on the following calculations/computations. An example of a visibility mask 614 for the first layer is illustrated in FIG. 6.

Upon the first layer being registered (e.g., the first reference polygons are overlayed on the inspection image based on the first shift), similar shape localization and registration can be performed for the second layer.

Specifically, one or more second locations of one or more second inspection polygons in the inspection image, corresponding to the one or more second reference polygons, can be identified (210) (e.g., by the localization module 104 in PMC 102) using template images of the second reference polygons and template masks associated therewith. In some embodiments, the one or more second locations of the one or more second inspection polygons can be identified by matching, for each second inspection polygon, the template image and the associated template mask of a corresponding second reference polygon in a respective second search area in the inspection image. By way of example, the respective second search area for each second inspection polygon can be defined based on a location of the corresponding second reference polygon and an expected maximal overlay offset. It is noted that the one or more second inspection polygons can be identified from image(s) captured from the same perspective as of the reference image from which the template images of the second reference polygons are extracted.

FIG. 7 illustrates an example of shape localization and registration of the second layer in accordance with certain embodiments of the presently disclosed subject matter.

An example of a second template image 702 and a second template mask 704 for the ellipse structure 511 in the second layer is illustrated. They can be generated during recipe setup in a similar manner as described above with reference to the first template image and mask in FIG. 5. By way of example, the template image 702 (e.g., an image patch) enclosing the ellipse structure 511 can be extracted from the reference image 502 based on the location of the reference polygon 517 that the user drew for the ellipse structure 511.

The template mask 704 can be generated corresponding to the template image 702. The template mask 704 is indicative of proximity of a set of locations/pixels in the template image 702 to an edge/contour of the reference polygon 517. By way of example, the template mask comprises a set of values (represented by gray level values in the mask) corresponding to the set of locations in a predefined region of the template image. In the present example, the predefined region is an elliptical region along the edge of the reference polygon 517. For each location in the region, a distance between the location and a corresponding edge pixel of the reference polygon can be derived and used for providing a value for the corresponding location in the template mask.

In some embodiments, in cases where an edge/contour of the first reference polygon intersecting an edge/contour of the second reference polygon (e.g., the first structure and the second structure partially overlap, as exemplified in the present example), the template mask generated for the second reference polygon can exclude/disregard an image region related to the overlapped part of the contour of the second reference polygon. In some cases, an image region in the template mask that does not provide useful information, with respect to the contour of the second reference polygon, can be disregarded, such as the masked region as illustrated in the template mask 704. As described above, when deriving the template mask, multiple strips perpendicular/normal to the edge of the reference polygon can be plotted, and the values along the strip can be derived based on the distance between each pixel of the strip and the edge of the polygon. The masked region as illustrated in the template mask 704 exemplifies a region covered by the strips plotted for the overlapped part of the contour of the second reference polygon which should be excluded. The exclusion may serve for the purpose of avoiding the influence of the first structure when matching the second template image and mask in the second search area, thereby improving the accuracy of the identified locations of the second inspection polygons.

In order to identify the second inspection polygons in the inspection image 602 that correspond to the second reference polygons (i.e., the ellipse structures of the second layer) in the reference image 502, the template images and template masks generated for the second reference polygons during recipe setup are used. Specifically, by way of example, for the second reference polygon 517 corresponding to the ellipse structure 511, the template image 702 and template mask 704 generated therefor can be used for identifying the corresponding second inspection polygon in the inspection image 602.

By way of example, a second search area for the second inspection polygon can be defined on the inspection image 602 based on the location of the corresponding second reference polygon 516 and an expected maximal overlay offset. The expected maximal overlay offset can be predetermined, e.g., based on previous overlay data for the same layers of the same type of specimen. The search area can be centered around the center of the reference polygon 517, and the size of the search area can be predetermined, e.g., based on the expected maximal overlay offset.

An example of a second search area 706 for the second inspection polygon is illustrated (it is noted the illustrations in the figures are not proportional to the actual dimensions thereof or with respect to each other, but only for purpose of illustration and exemplification). The template image 702 and template mask 704 can be associated (e.g., by overlaying the template mask on the template image) and used for matching in the search area 706 for purpose of identifying the corresponding second inspection polygon.

By way of example, the matching can be performed by moving the template image 702 and the associated template mask 704 in the second search area 706 at a step size (e.g., the template image and mask can move as a sliding box in the search area 706, as exemplified by the dashed line square in 706), and performing image correlation at each step (e.g., correlation between the associated template image and mask, and the image portion in the search area that is presently covered by the template image and mask).

In some embodiments, optionally, the visibility mask 614 generated for the first layer can be associated with the inspection image for purpose of identifying the second inspection polygons. FIG. 3 illustrates a generalized flowchart of using the visibility mask during the identification of the second inspection polygons in accordance with certain embodiments of the presently disclosed subject matter.

A visibility mask can be generated (302) for the first layer representative of the registered first reference polygons, as described above, following the registration of the first layer. During the identification of the second inspection polygons as described with reference to block 210, the visibility mask as generated can be associated (304) with the inspection image (e.g., overlay the visibility mask on the inspection image) so as to mask out the identified first polygons thereof. For each second inspection polygon, the template mask and the template image of a corresponding second reference polygon can be matched (306) in a respective second search area in the inspection image associated with the visibility mask, thereby disregarding pixels in the registered first reference polygons.

For instance, a portion 708 of the visibility mask 614 corresponding to the second search area 706 can be overlayed on the search area, giving rise to a search area 710 where the first polygon 712 is masked out. In such cases, the pixels in the first polygon 712 will be disregarded during the matching between the associated template image and mask, and the search area 710. This can further prevent the influence of the first polygon when performing matching for the second polygon, thus improving the accuracy of the identified location of the second polygon.

It will be appreciated that matching with missing pixels, i.e., pixels that have been masked, can require virtual completion of features. For example, a structure to be detected may have one or more missing segments. Whether the structure is detected may be determined based on the remaining segments, which can require additional geometrical considerations, such as continuity of a piecewise line, uniqueness of a feature, or the like. However, if the missing segments constitute a large part of a feature, the feature may be erroneously detected in other locations. Such considerations can be taken into account when determining the order in which layers are to be matched, as described below.

Once the template image and mask traverse the entire second search area 710, a correlation map 714 can be generated based on the correlation result of each step. The correlation map represents the similarity between the template image and mask with respect to each image portion along the traverse of the search area. In one example, the position of the maximal value 716 in the correlation map 714 can be identified to correspond to the location of the second inspection polygon 701. Similarly, the remaining second inspection polygons in the inspection image 602 can be identified in a similar manner as of the identification of the inspection polygon 701.

In some embodiments, once the second locations of the second inspection polygons in the inspection image are identified, a second shift for the second layer can be determined (212) (e.g., by the registration module 106 in PMC 102) based on the one or more second locations. By way of example, the identified second locations of the second inspection polygons can be respectively compared with the locations of the corresponding reference polygons, giving rise to respective shifts therebetween. The second shift can be derived based on statistics of the respective shifts. For instance, the second shift can be an average of the respective shifts, where any type of averaging technique such as mean, median, etc., with or without weights, can be applied.

The second shift, once obtained, can be regarded as a per-layer shift. The second reference polygons can be registered with the inspection image based on the second shift. By way of example, the second reference polygons (e.g., as the user annotated on the reference image) can be placed/overlayed on the inspection image based on the second shift. FIG. 7 illustrates an example of a registered second layer 716, where the second referenced polygons (such as the polygon 517) are overlayed on the inspection image 602, representing the identified and registered second inspection polygons.

Once the second layer is registered, if it is determined that no other layers exist further to previously registered layers, the inspection image is considered to be properly registered. If another layer exists, the process of identifying inspection polygons, determining a per-layer shift and image registration can be repeated for the additional layer, in a similar manner as described with respect to blocks 210-212.

Upon the inspection image is registered, various metrology operations can be performed (e.g., by the metrology module 108 in PMC 102) based on the registered inspection image. By way of example, image segmentation can be performed on the inspection image based on the registered first and second reference polygons. For instance, the locations of the registered first and second reference polygons on the inspection image can be used as anchor points of the locations of the actual inspection polygons, and fine image segmentation can be performed in a surrounding region in order to identify the actual contours of the inspection polygons. By way of another example, an overlay measurement can be obtained based on the first shift and the second shift. In some cases, the first shift and/or the second shift can be represented as respective shifts in X and Y axis. Other metrology operations can be performed based on the registered image in addition to or in lieu of the above.

As the specimen comprises a plurality of layers, in some cases, it can be required to determine the order in which the layers (shapes in the layers) are matched and registered. It will be appreciated that the order (such as the first layer and second layer described in the present disclosure) is not necessarily the order in which the layers are manufactured during fabrication of the specimen. Rather, the order can be determined such that each layer registration utilizes as much information as possible and does not harm registration of other layers.

For example, thin features comprised within thicker features is preferred to be matched prior to matching the thicker ones, since otherwise the thin features may be masked and cannot be identified. On the other hand, thin features can be erroneously detected in more locations, while thicker features have higher chance of being located correctly. Thus, optimization can be required in order to determine a layer order that maximizes the information utilization. Optimization of the layer order may also take into account whether pixels of one layer are masked when matching further layers or not.

In some embodiments, a region of interest (ROI) is defined on the reference image, as exemplified in the reference image 502. A shift of the ROI in the inspection image can be determined based on at least one of the first shift and the second shift. In some cases, if there is no shift information provided in one of the axes from one of the layers, the ROI will be shifted in this axis only according to the shift provided in the other layer. In cases where the ROI is defined in the reference image, a structure may fully reside inside the ROI, or reside partially inside and partially outside. In such cases, the template image and template mask can be created for the overlap part between the ROI and the structure.

According to certain embodiments, the image registration process as described above can be part of a runtime examination process. In some cases, it can be included as part of a process for generating an examination recipe (e.g., a metrology recipe) usable by system 101 for performing image registration and metrology operations in runtime. Therefore, the presently disclosed subject matter also includes a system and method for generating an examination recipe as described above.

It is to be noted that examples illustrated in the present disclosure, such as, e.g., the examples of structures and layers, the exemplified template images and masks, the masking and/or correlation techniques, etc., are illustrated for exemplary purposes, and should not be regarded as limiting the present disclosure in any way. Other appropriate examples/implementations can be used in addition to, or in lieu of the above.

Among advantages of certain embodiments of the subject matter as described herein is providing an image registration system with improved accuracy in particular with respect to presence of overlay between different layers of a specimen.

This may be achieved by preparing a recipe during recipe setup including a template image and mask for each reference polygon in each layer that a user annotated on a reference image, where the template mask is specifically defined to give more weights to pixels that are on or in close proximity to the edges/contours of the reference polygon.

The template mask designed as such enables to focus on pixels in the reference image with maximal information (e.g., those in close proximity to the edges) rather than pixels that are less informative for matching purposes (e.g., distant pixels from the edges), thus improving the effectiveness and accuracy of localizing the shapes/polygons.

Using such polygon-specific recipe in runtime can enable localizing corresponding inspection polygons of each layer in the inspection image with greater accuracy, which attributes to a more accurate layer shift for each layer. The polygon-specific localization significantly improves the registration performance as compared to the global registration which registers all layers with the same shift.

It is to be understood that the present disclosure is not limited in its application to the details set forth in the description contained herein or illustrated in the drawings.

It will also be understood that the system according to the present disclosure may be, at least partly, implemented on a suitably programmed computer. Likewise, the present disclosure contemplates a computer program being readable by a computer for executing the method of the present disclosure. The present disclosure further contemplates a non-transitory computer-readable memory tangibly embodying a program of instructions executable by the computer for executing the method of the present disclosure.

The present disclosure is capable of other embodiments and of being practiced and carried out in various ways. Hence, it is to be understood that the phraseology and terminology employed herein are for the purpose of description and should not be regarded as limiting. As such, those skilled in the art will appreciate that the conception upon which this disclosure is based may readily be utilized as a basis for designing other structures, methods, and systems for carrying out the several purposes of the presently disclosed subject matter.

Those skilled in the art will readily appreciate that various modifications and changes can be applied to the embodiments of the present disclosure as hereinbefore described without departing from its scope, defined in and by the appended claims.

The invention claimed is:

1. A computerized system of examining a semiconductor specimen comprising a first layer and a second layer, the system comprising a processing and memory circuitry (PMC) configured to:
   obtain a recipe generated during recipe setup based on a reference image of the semiconductor specimen, the reference image having one or more first reference polygons representative of a first structure on the first layer and one or more second reference polygons representative of a second structure on the second layer annotated thereon, the recipe comprising: a template image for each reference polygon of the first and second reference polygons extracted from the reference image, and a template mask associated with the template image and indicative of proximity of a set of locations in the template image to an edge of the reference polygon;
   obtain an inspection image of the semiconductor specimen in runtime;
   identify one or more first locations of one or more first inspection polygons in the inspection image corresponding to the one or more first reference polygons using template images of the first reference polygons and template masks associated therewith;
   determine a first shift for the first layer based on the one or more first locations, and register the first reference polygons with the inspection image based on the first shift;
   identify one or more second locations of one or more second inspection polygons in the inspection image corresponding to the one or more second reference polygons using template images of the second reference polygons and template masks associated therewith; and determine a second shift for the second layer based on the one or more second locations, and register the second reference polygons with the inspection image based on the second shift.

2. The computerized system according to claim 1, wherein the one or more first reference polygons and the one or more second reference polygons are manually annotated by a user.

3. The computerized system according to claim 1, wherein the template image is extracted from the reference image to enclose the reference polygon, and the template mask comprises a set of values corresponding to the set of locations in a predefined region of the template image, each value derived based on a distance between a respective location and a corresponding edge pixel of the reference polygon.

4. The computerized system according to claim 1, wherein the inspection image and the reference image each comprises one or more perspective images captured from one or more perspectives of an examination tool, and wherein the template image for a reference polygon of a specific layer is extracted from a perspective image with a selected perspective based on visibility of the specific layer in the one or more perspective images, and the identifying one or more first locations and the identifying one or more second locations are performed on respective perspective images in accordance with the selected perspective.

5. The computerized system according to claim 1, wherein the PMC is configured to identify the one or more first locations by matching, for each first inspection polygon, the template image and the associated template mask of a corresponding first reference polygon in a respective first search area in the inspection image.

6. The computerized system according to claim 5, wherein the respective first search area for each first inspection polygon is defined based on a location of the corresponding first reference polygon and an expected maximal overlay offset.

7. The computerized system according to claim 5, wherein the matching for each first inspection polygon comprises moving the template image and the associated template mask in the respective first search area at a step size and performing image correlation at each step, giving rise to a correlation map, and wherein a first location of the one or more first locations of a corresponding first inspection polygon is identified based on a position of a maximal value in the correlation map.

8. The computerized system according to claim 1, wherein the PMC is configured to identify the one or more second locations by matching, for each second inspection polygon, the template image and the associated template mask of a corresponding second reference polygon in a respective second search area in the inspection image.

9. The computerized system according to claim 8, wherein the respective second search area for each second inspection polygon is defined based on a location of the corresponding second reference polygon and an expected maximal overlay offset.

10. The computerized system according to claim 1, wherein the PMC is further configured to generate a visibility mask for the first layer representative of the registered first reference polygons, and wherein the identifying one or more second locations comprises associating the visibility mask with the inspection image, and matching, for each second inspection polygon, the template mask and the template image of a corresponding second reference polygon in a respective second search area in the inspection image associated with the visibility mask thereby disregarding pixels in the registered first reference polygons.

11. The computerized system according to claim 1, wherein the PMC is further configured to perform image segmentation on the inspection image based on the registered first and second reference polygons.

12. The computerized system according to claim 1, wherein the PMC is further configured to obtain an overlay measurement based on the first shift and the second shift.

13. A computerized method of examining a semiconductor specimen comprising a first layer and a second layer, the method comprising:
obtaining a recipe generated during recipe setup based on a reference image of the semiconductor specimen, the reference image having one or more first reference polygons representative of a first structure on the first layer and one or more second reference polygons representative of a second structure on the second layer annotated thereon, the recipe comprising: a template image for each reference polygon of the first and second reference polygons extracted from the reference image, and a template mask associated with the template image and indicative of proximity of a set of locations in the template image to an edge of the reference polygon;
obtaining an inspection image of the semiconductor specimen in runtime;
identifying one or more first locations of one or more first inspection polygons in the inspection image corresponding to the one or more first reference polygons using template images of the first reference polygons and template masks associated therewith;
determining a first shift for the first layer based on the one or more first locations, and registering the first reference polygons with the inspection image based on the first shift;
identifying one or more second locations of one or more second inspection polygons in the inspection image corresponding to the one or more second reference polygons using template images of the second reference polygons and template masks associated therewith; and
determining a second shift for the second layer based on the one or more second locations, and registering the second reference polygons with the inspection image based on the second shift.

14. The computerized method according to claim 13, wherein the template image is extracted from the reference image to enclose the reference polygon, and the template mask comprises a set of values corresponding to the set of locations in a predefined region of the template image, each value derived based on a distance between a respective location and a corresponding edge pixel of the reference polygon.

15. The computerized method according to claim 13, wherein identifying the one or more first locations comprises matching, for each first inspection polygon, the template image and the associated template mask of a corresponding first reference polygon in a respective first search area in the inspection image.

16. The computerized method according to claim 15, wherein the respective first search area for each first inspection polygon is defined based on a location of the corresponding first reference polygon and an expected maximal overlay offset.

17. The computerized method according to claim 15, wherein the matching for each first inspection polygon comprises moving the template image and the associated template mask in the respective first search area at a step size and performing image correlation at each step, giving rise to a correlation map, and wherein a first location of the one or more first locations of a corresponding first inspection polygon is identified based on a position of a maximal value in the correlation map.

18. The computerized method according to claim 13, wherein the identifying the one or more second locations comprises matching, for each second inspection polygon, the template image and the associated template mask of a corresponding second reference polygon in a respective second search area in the inspection image, and wherein the respective second search area for each second inspection polygon is defined based on a location of the corresponding second reference polygon and an expected maximal overlay offset.

19. The computerized method according to claim 13, further comprising generating a visibility mask for the first layer representative of the registered first reference polygons, and wherein the identifying one or more second locations comprises associating the visibility mask with the inspection image, and matching, for each second inspection polygon, the template mask and the template image of a corresponding second reference polygon in a respective second search area in the inspection image associated with the visibility mask thereby disregarding pixels in the registered first reference polygons.

20. A non-transitory computer readable storage medium tangibly embodying a program of instructions that, when executed by a computer, cause the computer to perform a method of examining a semiconductor specimen comprising a first layer and a second layer, the method comprising:

obtaining a recipe generated during recipe setup based on a reference image of the semiconductor specimen, the reference image having one or more first reference polygons representative of a first structure on the first layer and one or more second reference polygons representative of a second structure on the second layer annotated thereon, the recipe comprising: a template image for each reference polygon of the first and second reference polygons extracted from the reference image, and a template mask associated with the template image and indicative of proximity of a set of locations in the template image to an edge of the reference polygon;

obtaining an inspection image of the semiconductor specimen in runtime;

identifying one or more first locations of one or more first inspection polygons in the inspection image corresponding to the one or more first reference polygons using template images of the first reference polygons and template masks associated therewith;

determining a first shift for the first layer based on the one or more first locations, and registering the first reference polygons with the inspection image based on the first shift;

identifying one or more second locations of one or more second inspection polygons in the inspection image corresponding to the one or more second reference polygons using template images of the second reference polygons and template masks associated therewith; and determining a second shift for the second layer based on the one or more second locations, and registering the second reference polygons with the inspection image based on the second shift.

* * * * *